United States Patent [19]

Ono et al.

[11] Patent Number: 5,669,741
[45] Date of Patent: Sep. 23, 1997

[54] DEVICE FOR SEPARATING POWDER MATERIAL FROM AN AIR FLOW

[75] Inventors: Yasushi Ono, Toyokawa; Etsuzou Kawai, Toyohashi, both of Japan

[73] Assignee: Sintokogio, Ltd., Japan

[21] Appl. No.: 565,552

[22] Filed: Nov. 30, 1995

[30] Foreign Application Priority Data

| Nov. 30, 1994 | [JP] | Japan | 6-323569 |
| Dec. 16, 1994 | [JP] | Japan | 6-334314 |
| Jan. 20, 1995 | [JP] | Japan | 7-026313 |

[51] Int. Cl.$^6$ ............................................. B65G 53/14
[52] U.S. Cl. ............ 406/79; 406/82; 406/108; 406/151; 406/173; 406/152
[58] Field of Search .................. 406/79, 82, 108, 406/151, 173, 152

[56] References Cited

U.S. PATENT DOCUMENTS

| 2,637,600 | 5/1953 | Dorfan | 406/152 |
| 3,314,734 | 4/1967 | Lewis | 406/173 |
| 4,320,559 | 3/1982 | Couture | 406/79 |
| 4,699,068 | 10/1987 | Engström | 406/173 |

FOREIGN PATENT DOCUMENTS

| 63-136613 | 9/1988 | Japan. | |
| 94076977 A1 | 8/1994 | WIPO | 406/173 |

Primary Examiner—Gary C. Hoge
Attorney, Agent, or Firm—Limbach & Limbach L.L.P.

[57] ABSTRACT

A device is disclosed for automatically collecting powder material displaced from between a belt conveyor and a chute which is disposed above the belt conveyor for feeding the powder material onto the belt conveyor, and for placing the collected powder material onto the belt conveyor. The device includes a) a duct device (10) disposed adjacent the chute and the belt conveyor for collecting powder material, b) a horizontally extending hollow cylinder (31) disposed above the belt conveyor, the cylinder having an air-flow inlet (33) which communicates with the duct device (10) and having a slit (34) at its bottom, the cylinder allowing an air flow from the duct device to pass along the inner surface of the cylinder, c) a blower (40) to suck air in the cylinder, and d) a chamber (35) disposed under the cylinder and having a weighted damper (36) at its bottom. When the blower is driven, an air flow is generated in the duct device. Thus the powder material caught in the duct device is carried by the air flow into the cylinder where it is separated from the air flow by centrifugal force and accumulates in the chamber. The powder material is then automatically discharged through the weighted damper onto the belt conveyor.

4 Claims, 3 Drawing Sheets

DEVICE FOR SEPARATING POWDER MATERIAL FROM AN AIR FLOW

FIELD OF THE INVENTION

This invention relates to a device to collect by an air flow powder material displaced from its allocated passage on a belt conveyor, separate the collected material from the air flow, and return it onto the belt conveyor or place it onto another belt conveyor.

PRIOR ART

Conventionally, providing seal members or skirts beside the lower end portion of a chute disposed above a belt conveyor is well-known to prevent powder material from escaping from the powder material conveying system. However, since the powder material fed from the chute and the air in the chute pressurized by the powder material are imparted great energy, the powder material tends to be blown from under the skirt and dropped from the belt conveyor. The blown powder material must be manually removed or placed again onto the belt conveyor.

Japanese Utility Model Laving-Open (Kokai) No. 63-136,747 teaches a device to separate powder material from an air flow. The device has a hollow horizontal cylinder, or a centrifugal separator chamber, which has an intake at one end to receive an air flow and powder material entrained therewith, and an air outlet at the other end, and which has an elongated gate axially formed in the bottom to centrifugally separate the powder material from the air flow. The air flow entering the intake, together with the powder material, passes along the inner surface of the cylinder. The powder material is thrown through the gate by centrifugal force. Thus the powder material is separated from the air flow. If the density of the powder material in the air flow is high and thus the powder material is oversupplied to the centrifugal separator chamber, that powder that cannot be separated at the gate tends to fill the space around the air outlet nozzle and is then fed out of the air outlet into the air discharge system. A receiving chamber is disposed below the gate to receive the separated powder material. However, it is difficult to make the receiving chamber air-tight because of the need to remove the collected material therefrom. If suction is used as a source of air flow, an air flow from the receiving chamber tends to pass the gate and enter the cylinder to hinder the revolution of the powder material in the centrifugal separator chamber, resulting in the accumulation of the powder material therein. If the accumulation grows to a certain extent, the powder material not only tends to be carried out of the air outlet, but also to hinder the air flow in the centrifugal separator chamber and to decrease the rate of air flow, resulting in remarkably lowering the efficiency of the centrifugal separation, which is very disadvantageous.

SUMMARY OF THE INVENTION

This invention aims to resolve the drawbacks mentioned above and to provide a device to automatically carry, by an air flow, powder material that leaves the allocated passage on a belt conveyor and separate the powder material from the air flow and return it on the same belt conveyor or place it onto another belt conveyor. In this invention, "powder material" includes granular or particulate material that can be carried by an air flow.

The device of the invention to automatically collect the powder material by an air flow and separate it from the air flow includes a) a duct device disposed outside of and adjacent the lower ends of a chute and above a belt conveyor for collecting the powder material, b) a horizontally extending hollow cylinder disposed above the belt conveyor, the cylinder having an air-flow inlet which communicates with the duct device and having a slit at the bottom thereof, the cylinder allowing an air flow from the duct device to pass along the inner surface of the cylinder, c) a suction blower to suck air in the cylinder, and d) a chamber disposed under the cylinder and having a weighted damper at the bottom thereof. When the blower is driven, an air flow is generated in the duct device. The air flow carries powder material from the duct device into the cylinder. Since the air flow passes along the inner surface of the cylinder, the powder material is thrown through the slit by centrifugal force, thereby accumulating in the chamber. When the weight of the accumulated powder material reaches a certain point which corresponds to the weight of the weighted damper, the damper automatically opens, thereby dumping the accumulated powder material onto a conveyor belt.

The invention also provides a duct device and an improved powder material separating device for use in the automatic device mentioned above.

DETAILED DESCRIPTION OF THE PREFERRED EMBODIMENT

Figure 1:
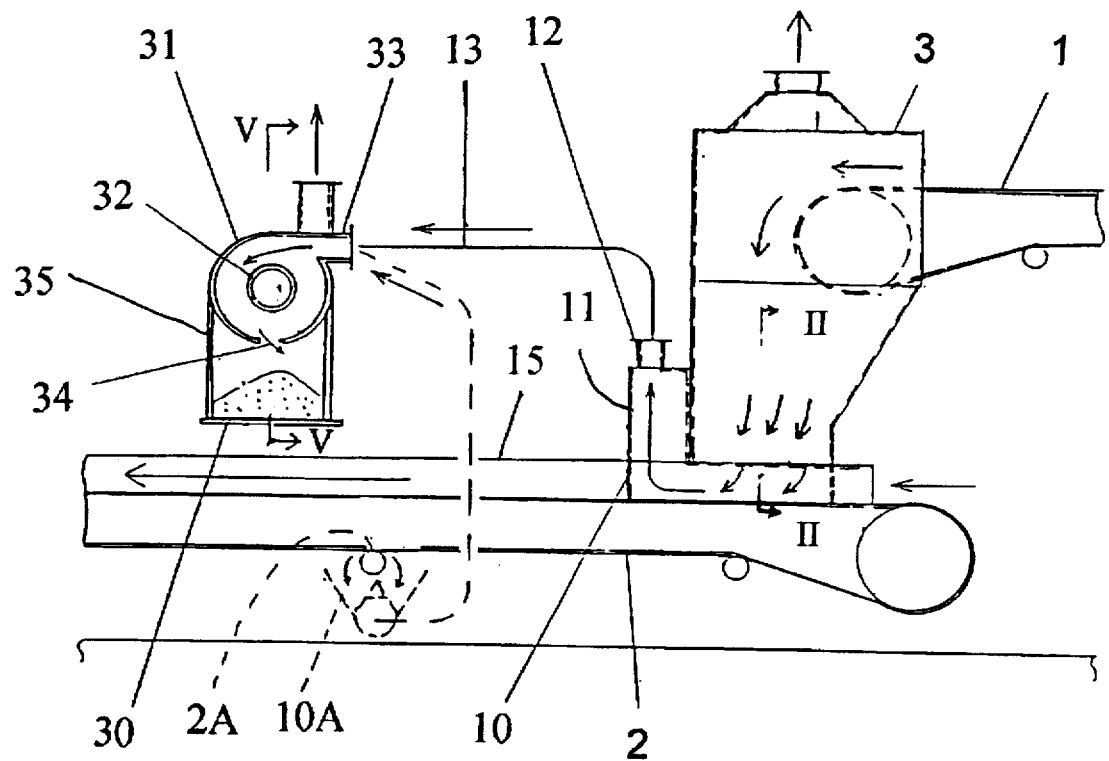
FIG. 1 is a schematic side view of an embodiment of the automatic device of the invention.

In FIG. 1 an upper belt conveyor 1, a lower belt conveyor 2, and a chute 3, are arranged so that powder material is transferred from the upper belt conveyor 1 onto the lower one through the chute 3. The chute 3 is confined by walls, except that its bottom is open and faces the lower belt conveyor 2. A part of its rear wall is also open to receive the downstream end of the upper belt conveyor 1. Its top wall is provided with an opening to communicate with a dust collector (not shown). The lower belt conveyor 2 is greater in width than that of the chute 3, which is positioned in the middle of the conveyor, leaving room for spaces on both sides of the chute 3.

Figure 2:
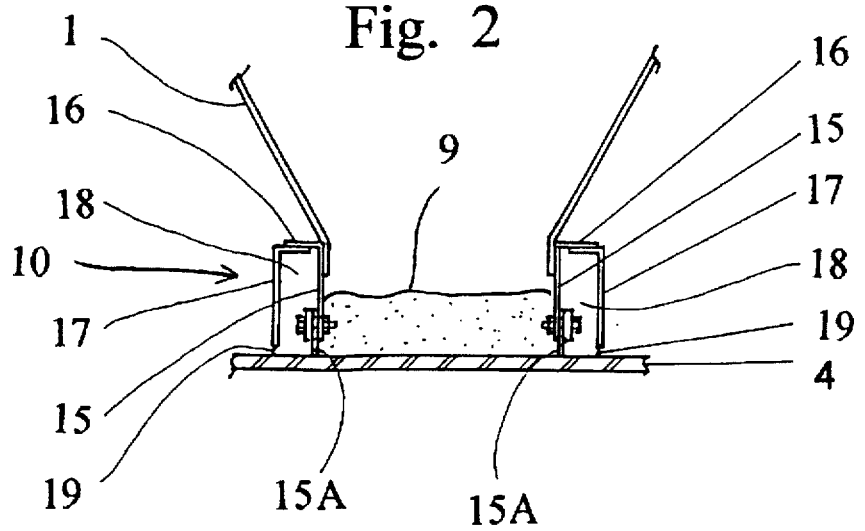
FIG. 2 is a cross section along line II—II in FIG. 1, showing a sectional view of a duct device disposed adjacent a chute and a belt conveyor.
Figure 3:
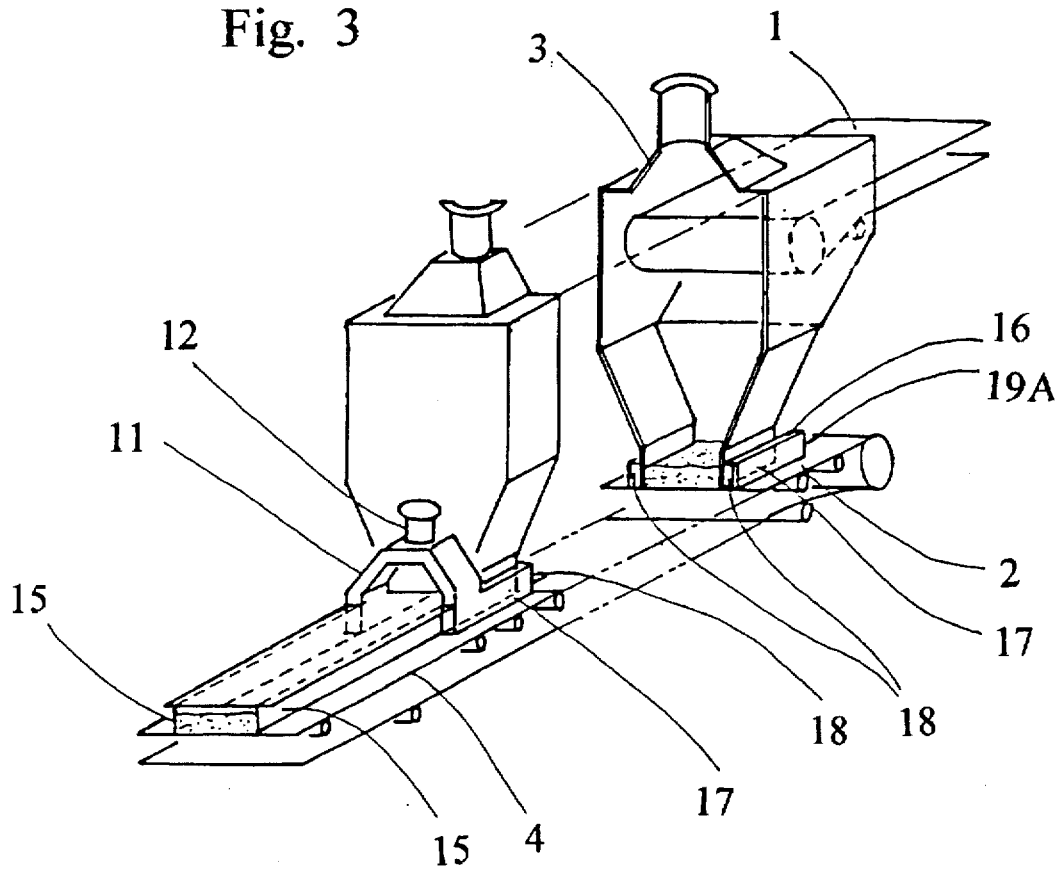
FIG. 3 is a perspective view of the duct device with the chute and belt conveyor of FIGS. 1 and 2, wherein the duct device and chute are cut into halves, and the halves are separated to show their insides.

A duct device 10 is disposed on both sides of the lower part of the chute 3 and above those parts of a conveyor belt 4 of the lower conveyor 2 that are not covered by the chute 3. As shown in FIGS. 2 and 3, the duct device 10 has two ducts 16, one disposed on each side of the chute 3. Each duct 16 has an inner wall 15 and an outer wall 17, thereby defining therebetween a passage for powder material on the conveyor belt 4. The tops of the inner and outer walls 15, 17 are bent so as to form a top for each duct. The inner wall 15 extends horizontally farther than the outer wall 17, as shown in FIGS. 1 and 3. A rubber skirt, or seal member 15A, is attached to the lower end of the inner wall 15, which is spaced apart from the conveyor belt 4. The rubber seal member 15A contacts the conveyor belt 4 to minimize the amount of powder material 9 that leaks from under the seal member 15A. The powder material 9 that passes the lower end of the seal member 15A enters a space 18 defined by the inner and outer walls and conveyor belt 4. Each duct 16 has an opening 19A at its upstream end for air intake. The outer wall 17 of each duct has a slit, or opening 19, (see FIG. 2) at its lower part adjacent the conveyor belt 4. The slit may be formed by cutting the lower end of the outer wall so as to leave a space between the wall and the conveyor belt 4. This slit acts as an air intake. These ducts 16, 16 are connected by a convergent duct part 11 that straddles the powder material passage on the conveyor belt 4. The duct part 11 has an outlet 12. This outlet 12 is connected to a suction pipe 13 which is in turn connected to an intake 33 of a powder material separating device 30 disposed downstream and above the belt conveyor 2.

Figure 4:
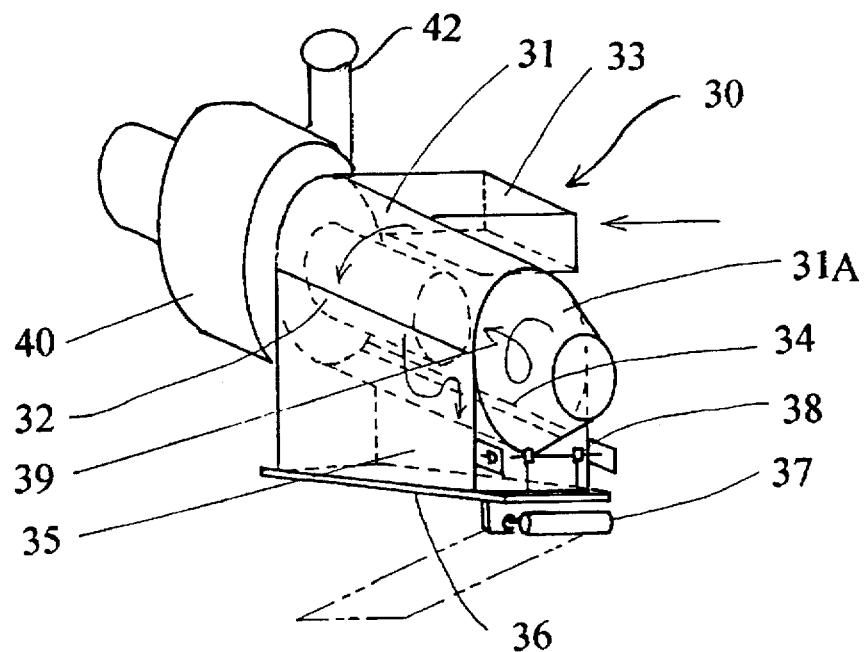
FIG. 4 is a perspective view of the powder material separating device of the automatic device of FIG. 1.
Figure 5:
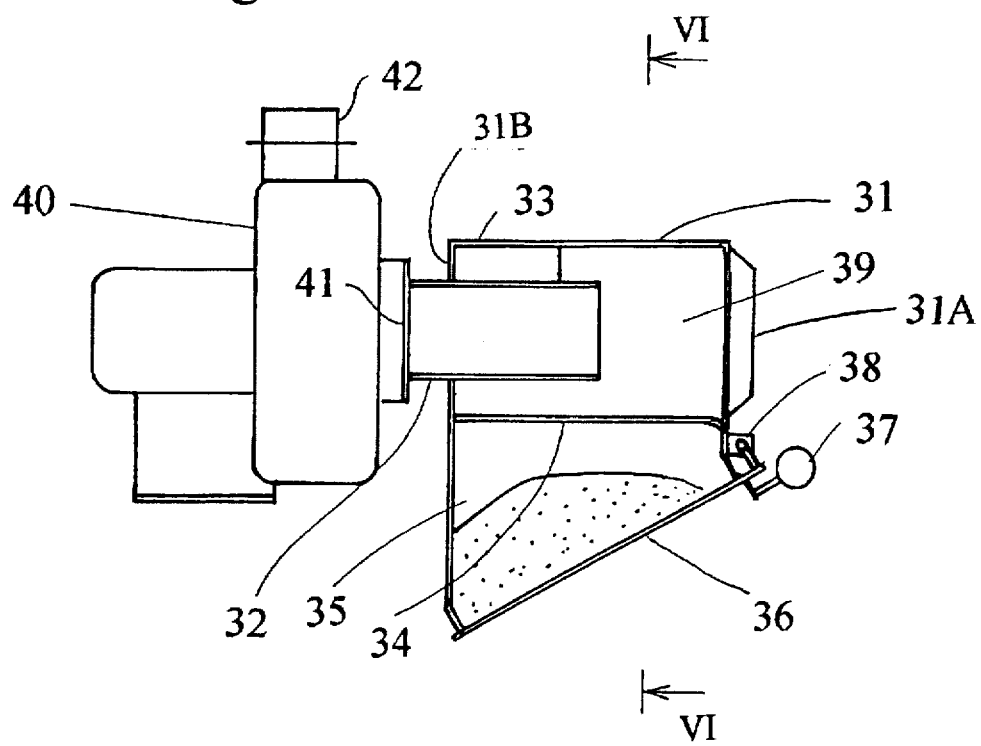
FIG. 5 is a cross-sectional side view taken along line V—V in FIG. 1.
Figure 6:
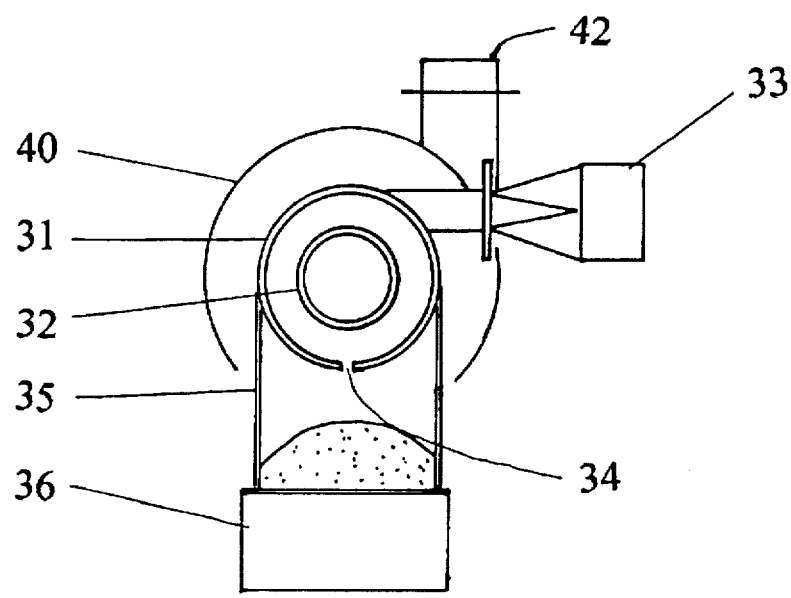
FIG. 6 is a cross-sectional front view taken along line VI—VI in FIG. 5.

An additional duct device 10A, which is shown in broken lines in FIG. 1 and which is similar to the duct device 10, may be provided under a return roller 2A. The powder material adhering to the surface of the conveyor belt 4 is scraped and dropped by the return roller 2A into an opening of a duct positioned below. The collected powder material is then conveyed by the suction from the blower 40 through a duct that leads to the intake 33. As shown in FIGS. 4, 5, and 6, the separating device 30 has a concentric outer hollow cylinder 31 and inner hollow cylinder 32. These cylinders 31, 32 extend horizontally and parallel to each other. A part of the side wall of the outer cylinder is cut open near one of its ends and connected to the intake 33 as shown in FIGS. 4 and 5. The other end of the outer cylinder 31 is closed by a hollow conical frustum 31A, while the first end, except for the space occupied by the inner cylinder 32, is closed by a flat annular plate 31B. A slit, or gate 34, is formed in the bottom of the outer cylinder 31, over the length of the cylindrical part thereof. One end of the inner cylinder 32 protrudes outwardly beyond the plate 31B forming the first end of the outer cylinder 31 and is connected to an intake port 41 of a low-pressure blower 40, which has an outlet port 42. The other end of the inner cylinder 32 is spaced apart from the conical frustum 31A of the outer cylinder 31, thereby providing a space 39 therebetween.

A hopper, or chamber 35, is disposed below the outer cylinder 31. The chamber has a bottom 36 that can be opened and closed in any conventional way. The bottom 36 is preferably a weighted damper having a weight 14 and a hinged support 15.

According to the structure of the device to automatically collect and separate powder material from the air flow, the suction blower 40 is begun to be driven before powder material is fed onto the belt conveyor 2 through the chute 3, so that air flows through the openings 19A and 19 into the ducts 16. Thus the powder material fed onto the conveyor belt 4 and that happened to enter the air space 18 is carried by the air flow into the outer cylinder 31. The air flow passes between the outer and inner cylinders with the centrifugal force causing it to flow, rotating along the inner surface of the outer cylinder, and the powder material entrained in the air flow is thrown out of the space through the slit 34 into the chamber 35 by centrifugal force. The air then flows into the inner cylinder 32 and through the blower 40 and is discharged from the outlet 42.

During the process, if an excessive supply of powder material is introduced into the cylinder 31, and cannot pass through the slit 34, the powder material is pressed against the inner wall of the conical frustum 31A due to inertia. Thus the powder material is not brought into the blower 40. Since the space 39 near the conical frustum 31A functions as an area that can reduce the rate of the air flow, this enhances the effect to prevent the powder material from being brought into the blower. Further, the configuration of the conical frustum causes the accumulated powder material to slip down to the chamber 35 through the slit 34 when the operation of the blower 40 is stopped, thereby preventing the growth of an accumulation of powder within the cylinders 31, 32.

Further, during the process, since the air pressure in the outer cylinder 31 is negative, i.e., lower than the air pressure outside the cylinder 31, the weighted damper 36 is tightly closed due to the pressure difference. Thus an air flow from the chamber 35 to the cylinder 31 does not occur. When the process is completed and the operation of the blower is stopped, the negative pressure caused by the suction is relieved, so that due to the weight of the accumulated powder material the damper rotates about the hinged support to be opened. Thus the material is automatically discharged onto the conveyor 2. If the sealing property of the damper is lowered for any reason and an air flow occurs from the chamber 35 through the slit 34 into the cylinder 31, the air flow might hinder the flow of the powder material through the slit 34. However, even then since the flow of the powder material is directed towards the conical frustum 31A, the speed of the revolving movement of the powder material is maintained, thereby enabling the efficiency of the separation of the powder material to be maintained.

What we claim is:

1. An apparatus for collecting powder material disposed between a belt conveyor and a chute disposed above the belt conveyor for feeding the powder material onto the belt conveyor, comprising:

a) a duct device disposed adjacent to the lower ends Of the chute and above the belt conveyor for collecting powder material;

b) a horizontally extending hollow cylinder disposed above the belt conveyor for centrifugally separating powder material from a powder-material-carrying air flow from the duct device, the hollow cylinder having a slit at the bottom thereof;

c) a suction blower for drawing air in the hollow cylinder; and d) a chamber disposed under the slit of the hollow cylinder and having a weighted damper at the bottom thereof.

2. The apparatus of claim 1, wherein the duct device includes:

a) ducts to cover both sides of the chute facing the top surface of the belt conveyor, an inner lower part of each duct having a seal member which contacts the belt conveyor, each duct having openings formed at an upstream end in the direction of movement of the conveyor and an outer lower part thereof; and b) a convergent duct part which communicates with the ducts at one end thereof, the duct part positioned downstream of the chute and having an outlet connected to an air-flow inlet of the hollow cylinder.

3. The apparatus of claim 1, wherein the hollow cylinder is covered by a hollow conical frustum at a first end and closed by a plate at a second end and having an air-flow inlet formed in a cylindrical wall thereof near the second end, the hollow cylinder having an inner hollow cylinder therein, the inner cylinder extending through the plate into the suction blower such that the suction blower communicates with the hollow cylinder through the inner hollow cylinder.

4. The apparatus of claim 2, wherein the hollow cylinder is covered by a hollow conical frustum at a first end and closed by a plate at a second end and having an air-flow inlet formed in a cylindrical wall thereof near the second end, the hollow cylinder having an inner hollow cylinder therein, the inner cylinder extending through the plate into the suction blower such that the suction blower communicates with the hollow cylinder through the inner hollow cylinder.

* * * * *